No. 643,651. Patented Feb. 20, 1900.
E. M. HEYLMAN.
CREAM SEPARATOR.
(Application filed June 9, 1899.)
(No Model.)
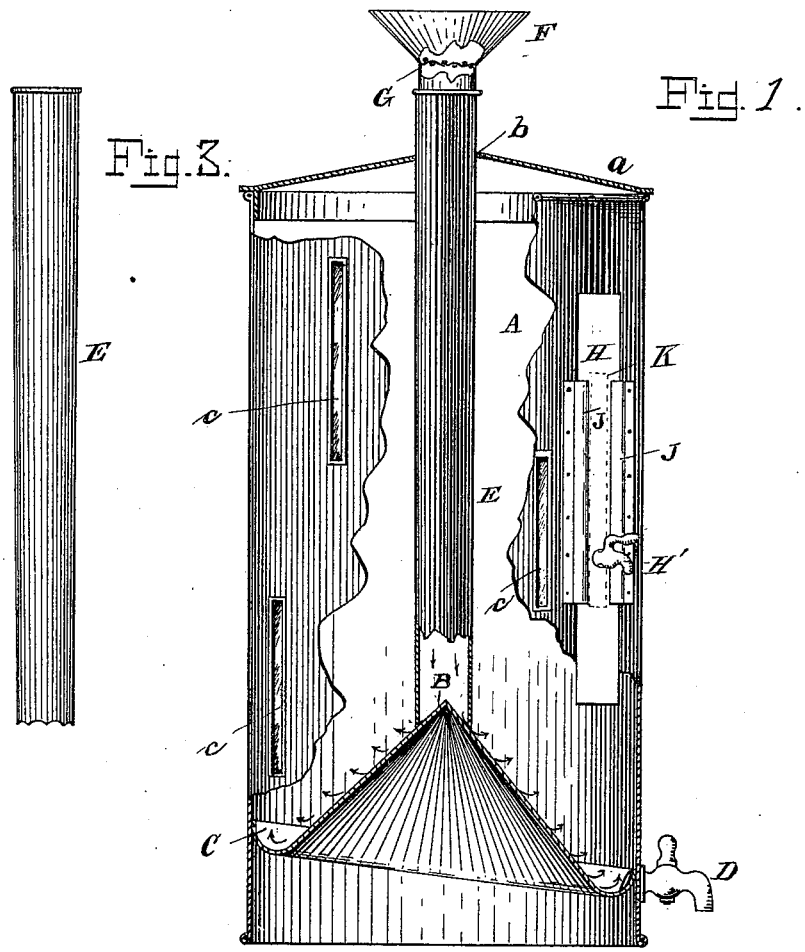
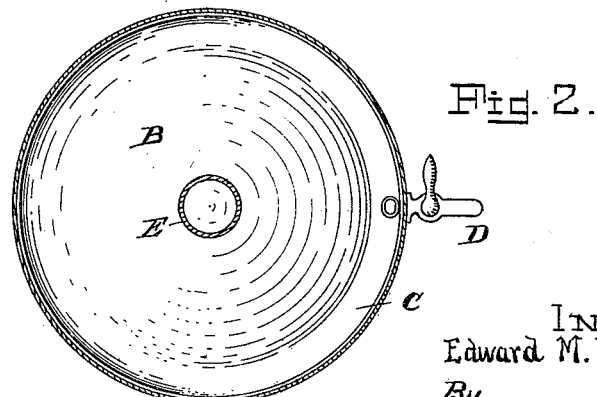
WITNESSES.
INVENTOR
Edward M. Heylman
By L. M. Thurlow
ATTY.

UNITED STATES PATENT OFFICE.

EDWARD M. HEYLMAN, OF PEKIN, ILLINOIS, ASSIGNOR TO THE ACME HARVESTER COMPANY, OF SAME PLACE.

CREAM-SEPARATOR.

SPECIFICATION forming part of Letters Patent No. 643,651, dated February 20, 1900.

Application filed June 9, 1899. Serial No. 719,998. (No model.)

*To all whom it may concern:*

Be it known that I, EDWARD M. HEYLMAN, a citizen of the United States, residing at Pekin, in the county of Tazewell and State of Illinois, have invented certain new and useful Improvements in Cream-Separators; and I do hereby declare that the following is a full, clear, and exact description of the invention, which will enable others skilled in the art to which it appertains to make and use the same.

This invention pertains to cream-separators, but more particularly to that class of devices wherein the cream is separated from the warm fresh milk by the admixture of a liquid of much lower temperature. This class of separators being well known, a description thereof to make the objects understood seems unnecessary. I will therefore proceed to the explanation of my invention with the aid of the accompanying drawings, in which—

Figure 1 is an elevation of the device in part section. Fig. 2 is a plan view, also in part section. Fig. 3 is an elevation of a water-conduit having serrations in its lower end.

In the several figures letters of reference correspond with those in the following specification.

A is a receptacle having a coned bottom B, whose apex rises within the said receptacle and is substantially centrally located. The annular base of the cone is recurved to form an inclined trough C, which is provided with a faucet D at its lowest point, as shown. By this means the entire contents of the receptacle may be quickly withdrawn. The said trough is soldered or otherwise attached to the wall of the receptacle in such a way as to prevent leakage. The usual lid or cover $a$ is provided, in the top of which is an aperture $b$, through which is inserted a portable conduit E, whose lower end is notched or serrated and rests upon the top of the cone, the point of the cone and the aperture $b$ in the cover serving conjointly to keep the said conduit erect. A funnel F, having a strainer G, is inserted in the top of the conduit, through which the warm milk is poured. I provide an adjustable faucet H' for the receptacle, the same being secured to a slide H, held between the wall A of the receptacle and the springs J. Said plate H covers a slot K in the wall, the latter being indicated by dotted lines. Suitable packing for making a close joint is provided for the slide, so that leakage is prevented. I provide also sight-panes so arranged that the milk-level can always be detected. I am aware that sight-panes are not new; but I arrange these so that each one projects beyond its neighbor, as shown in the drawings, whereby the fluid-level is never at a point where it cannot be seen. I may provide a stationary faucet instead of an adjustable one, and, in fact, this method is the best, for the reason that the apparatus can be kept cleaner and sweeter. The level of the cream may be brought to the upper faucet by drawing off the milk from the lower one if the cream is too high or by adding water to raise the cream-level when it is too low, as is obvious.

The operation of my improved creamer is quite simple. The milk may be either poured in at the top by removing the cover or lid $a$ or by straining it through the funnel F. When the desired quantity of that fluid has been put into the receiver, a quantity of water of lower temperature than the milk is poured through the conduit and mixes with the milk, as indicated by the darts. In other words, the water strikes the cone, passes through the serrations in the conduit and passes down the sides of such cone in an even sheet, and flows outwardly into the fluid. This chills the milk and immediately forces the cream to the surface of the fluid, from whence it is withdrawn through the faucet provided therefor, as above stated. In using the adjustable faucet the slide H is raised or lowered to meet the cream-level for the drawing-off operation. After the water has been added the conduit E is immediately withdrawn through the aperture $b$ and the cream is allowed to rise without interference.

The advantage of being able to draw the cream from the top of the milk is of considerable moment, for when drawing the milk and cream from the lower faucet, as in ordinary practice, much cream is lost by adhering to the sides as the milk-level falls therein.

By withdrawing it at the top this disadvantage is overcome. While it is not new to provide a faucet for this purpose, I shall claim it herein in combination with my apparatus.

The separator is easily cleaned and sweetened by means of its simple construction.

Various changes may be made in the device—such, for instance, as changing the shape of the cone and the conduit, altering their positions, or attaching said conduit to the cone—without departing from the spirit of my invention.

Having described my invention in its various details and shown its operations, I claim—

1. A cream-separator having a receptacle provided with a conical bottom, the point of such cone being uppermost within said receptacle and substantially central, the base thereof provided with an annular trough, substantially as shown, such trough inclined whereby a lowest point is obtained, a faucet at such lowest point for carrying away the contents of the receptacle in combination with a removable conduit adapted to rest upon the upper portion of the cone and provided with serrations at its end where it rests on such cone all for the purposes set forth and described.

2. In a cream-separator, the combination of a receptacle, a coned bottom therefor whose apex is uppermost and substantially central, an annular trough formed at the base of said cone, such trough inclined to form a lowest point for drawing-off purposes, a faucet at said lowest point, a removable conduit having serrations in its lower edge, said lower edge resting on the cone near its apex whereby water introduced into such conduit will flow down the cone equally at all points, a funnel having a strainer therein for the top of the conduit and a cover or lid for the receptacle, the same being provided with an aperture for the insertion of said conduit all for the purposes described.

In testimony whereof I affix my signature in presence of two witnesses.

EDWARD M. HEYLMAN.

Witnesses:
L. D. WRIGHT,
R. S. HORNISH.